United States Patent
Augustsson

(10) Patent No.: US 6,501,872 B2
(45) Date of Patent: Dec. 31, 2002

(54) BRAGG GRATING ASSISTED MMIMI-COUPLER FOR TUNABLE ADD-DROP MULTIPLEXING

(75) Inventor: Torsten Augustsson, Upplands Väsby (SE)

(73) Assignee: Telefonaktiebolaget LM Ericsson Stockholm, Stockholm (SE)

( * ) Notice: Subject to any disclaimer, the term of this patent is extended or adjusted under 35 U.S.C. 154(b) by 19 days.

(21) Appl. No.: 09/871,726

(22) Filed: Jun. 4, 2001

(65) Prior Publication Data

US 2002/0006249 A1 Jan. 17, 2002

(30) Foreign Application Priority Data

Jun. 5, 2000 (SE) ............................................. 0002081

(51) Int. Cl.$^7$ ............................ G02B 6/28; G02B 6/293
(52) U.S. Cl. ............................... 385/24; 385/3; 385/17; 359/127
(58) Field of Search ................................ 385/1–10, 24, 385/31, 37, 38, 47, 48; 359/115–117, 124–134

(56) References Cited

U.S. PATENT DOCUMENTS

| 5,953,467 A | * | 9/1999 | Madsen | 372/20 |
| 6,222,958 B1 | * | 4/2001 | Paiam | 356/491 |
| 6,345,136 B1 | * | 2/2002 | Augustsson | 119/650 |
| 2002/0006249 A1 | * | 1/2002 | Augustsson | 385/24 |

FOREIGN PATENT DOCUMENTS

WO  WO 00/18042 A  3/2000

OTHER PUBLICATIONS

Augustsson, T., "Bragg Grating Assisted MMIMI Coupler for Wavelength Selective Switching", Electronics Letters, Dec. 10, 1998, vol. 34, No. 25, pp. 2416–2417.*

Torsten Augustsson, "Bragg Grating–Assisted MMI–Coupler for Add–Drop Multiplexing," *Journal of Lightwave Technology*, vol. 16, (Aug. 1998), 1517–1522.

* cited by examiner

*Primary Examiner*—Akm E. Ullah
*Assistant Examiner*—Michelle R. Connelly-Cushwa
(74) *Attorney, Agent, or Firm*—Burns, Doane, Swecker & Mathis, L.L.P.

(57) ABSTRACT

An apparatus for add/drop multiplexing of a wavelength channel multiplex comprises an MMI coupler and MI arm section. The MMI coupler includes a multiplex input, an add channel input, a drop channel output, a multiplex output, and at least four input/output terminals. The MI arm section includes four waveguides, wherein each waveguide is optically connected to a respective one of said input/output terminals of the MMI coupler; and is at least provided with a first phase control element, a reflection grating, a second phase control element, and a wide frequency range reflection means. Further, each of the reflection gratings are provided with a heater means for tuning the respective reflection grating to the wavelength channel to be added/dropped and the wide frequency range reflection means reflect all other channels. The first and second phase control elements are adapted to direct the channel to be added/dropped to the multiplex output/drop channel output and to direct remaining channels to the multiplex output.

30 Claims, 4 Drawing Sheets r= 0.9 r= 0.97 r= 1

BRAGG GRATING ASSISTED MMIMI-COUPLER FOR TUNABLE ADD-DROP MULTIPLEXING

This application claims priority under 35 U.S.C. §§ 119 and/or 365 to 0002081-8 filed in Sweden on Jun. 5, 2000; the entire content of which is hereby incorporated by reference.

TECHNICAL FIELD OF THE INVENTION

The present invention generally relates to optical transmission techniques, particularly single mode integrated optics, for tele and data communication.

More specifically, the invention relates to apparatus for tunable add/drop multiplexing and to methods for tunable add/drop multiplexing.

DESCRIPTION OF RELATED ART AND BACKGROUND OF THE INVENTION

Tunable optical add-drop multiplexers are needed in different kind of networks. Especially in ring and bus configurations the add-drop functionality is vital. Add-drop multiplexers have been implemented using various principles.

A multiplexer provided with Bragg gratings and based on an MZI structure (MZI, Mach-Zehnder interferometer) is depicted in *Low Crosstalk Optical Add-Drop Multiplexer based on a Planar Silica-On-Silicon Mach-Zehnder Interferometer with UV-induced Bragg Gratings and UV-Trimming*, J.-M. Jouanno et al., Tech. Dig. Bragg Gratings, Photosensitivity, and Poling in Glass Fibers and Waveguides: Applications and Fundamentals, OSA, 1997, Williamsburg, Va., pp. 259–261. In principle, an add/drop multiplexer may be achieved using such a device, which comprises two directional couplers interconnected by two interference arms, a so-called MZI structure. In practice, however, possibly two separate devices are required in order to achieve complete add/drop functionality. Alternatively, two Bragg gratings may be cascaded in each Mach-Zehnder arm. Further, coupling to so-called cladding modes may occur in the grating structures, which would result in deteriorated performance of the device, particularly for channels at carrier wavelengths shorter than the Bragg wavelength.

A wavelength selectively tunable device, called MMIMZI demultiplexer, (MMIMZI, multimode interference Mach-Zehnder interferometer) may be utilized as a reconfigurable demultiplexer, see e.g. the publication *A new type of tunable demultiplexer using a multi-leg Mach-Zehnder interferometer*, J.-P. Weber et al., Proc. ECIO '97 EthE5, Stockholm, pp. 272–275, 1997. Cascading of two such devices may result in a complete tunable add/drop multiplexer. Such a multiplexer has though a very narrow range within which the crosstalk performance is good. This may be solved, but then very complex interference circuits are required to achieve nonlinear phase response in the Mach-Zehnder arms of the multiplexer. Further, interference problems may occur for transmitted channels when two MMIMZI devices are cascaded.

A wavelength selective device based on an MMIMIBg structure (MMIMIBg, Bragg grating assisted multimode interference Michelson interferometer), which offers completely individual switching, is depicted in *Bragg grating assisted MMIMI coupler for wavelength selective switching*, T. Augustsson, Electron. Lett., Vol. 34(25), pp. 2416–2418, 1998. Even though the theory of the technique indicates low crosstalk, e.g. fabrication process dependent variations may increase the crosstalk. Possibly, two separate devices are needed to obtain add/drop-functionality.

An MMI-based device provided with Bragg gratings is disclosed in the publication *Bragg Grating-Assisted MMI coupler for Add-Drop Multiplexing*, T. Augustsson, J. Lightwave Technol., Vol. 16(8), pp. 1517–1522, 1998. It is, however, difficult to realize such a device, which can handle channels separated by less than 400 GHz, and still exhibit good filter performance.

SUMMARY OF THE INVENTION

It is a main object of the present invention to provide an apparatus and method for add/drop multiplexing of a wavelength channel multiplex, which are capable of handling a large number of channels simultaneously.

It is in this respect a particular object of the invention to provide such apparatus and method for add/drop multiplexing of a wavelength channel multiplex, which are capable of handling wavelength channels that are closely spaced.

It is still a further object of the invention to provide such apparatus and method for add/drop multiplexing of a wavelength channel multiplex, which exhibit tunability between a plurality of closely spaced wavelength channels.

It is yet a further object of the invention to provide an apparatus for add/drop multiplexing of a wavelength channel multiplex, which is compact and which includes short propagation lengths for the wavelength channels.

These objects among others are, according to a first aspect of the present invention, attained by an apparatus for optical add/drop multiplexing comprising an MMI coupler at least of size 4×4 and an MI arm section.

The MMI coupler includes a multiplex input terminal for input of said wavelength channel multiplex into said MMI coupler; an add channel input terminal for input of a wavelength channel to be added to said multiplex into said MMI coupler; a drop channel output terminal for output of a wavelength channel to be dropped from said multiplex from said MMI coupler; a multiplex output terminal for output of said wavelength channel multiplex from said MMI coupler; and at least four input/output terminals. The MMI coupler is further effective to split light incoming on one of its input terminals into light shares delivered onto its input/output terminals, and to combine light shares incoming on its input/output terminals into combined light delivered onto one of its output terminals in dependence on the mutual phase relation of the incoming light shares.

The MI arm section includes at least four waveguides, wherein each waveguide is optically connected to a respective one of the input/output terminals of the MMI coupler, and wherein each of all, or of all but one, of the waveguides is at least provided with, as seen from the MMI coupler, a first phase control element, a narrow band reflection grating, preferably a Bragg grating, a second phase control element, and a wide frequency range reflection means.

According to the invention each of said narrow band reflection gratings is provided with a heater means, preferably a Peltier element, for tuning the respective narrow band reflection grating to the wavelength channel to be added and/or to the wavelength channel to be dropped; the first phase control elements are effective to direct the channel to be added to the multiplex output terminal of the MMI coupler and/or to direct the channel to be dropped to the drop channel output terminal of the MMI coupler; the wide frequency range reflection means are effective to reflect all wavelength channels comprised in the input wavelength channel multiplex except the wavelength channel to be dropped; and the second phase control elements are effective to direct all wavelength channels comprised in the input wavelength channel multiplex except the wavelength channel to be dropped to the multiplex output terminal of the MMI coupler.

The apparatus, and particularly the Bragg gratings, are preferably made of a material having a strongly temperature dependent refractive index, i.e. a high |dn/dT|, such as a monomer or a polymer.

In a particularly advantageous embodiment of the invention each of the wide frequency range reflection means has a reflection coefficient below 1 for the wavelength channels comprised in the input wavelength channel multiplex. The reflection coefficient may be between 0.82 and 0.98, preferably between 0.86 and 0.94, more preferably between 0.88 and 0.92, and most preferably around 0.90.

In yet a particularly advantageous embodiment of the invention, the wide frequency range reflection means are each comprised of a loop mirror device, particularly an MMI-based device.

According to a second aspect of the present invention an apparatus for optical drop multiplexing comprising an MMI coupler at least of size 3×3 and an MI arm section is provided.

The MMI coupler includes a multiplex input terminal for input of said wavelength channel multiplex into said MMI coupler; a drop channel output terminal for output of a wavelength channel to be dropped from said multiplex from said MMI coupler; a multiplex output terminal for output of the remaining wavelength channel multiplex from said MMI coupler; and at least three input/output terminals. Further, the MMI coupler is effective to split light incoming on its input terminal into light shares delivered onto its input/output terminals, and to combine light shares incoming on its input/output terminals into combined light delivered onto one of its output terminals in dependence on the mutual phase relation of the incoming light shares.

The MI arm section includes at least three waveguides, wherein each waveguide is optically connected to a respective one of said input/output terminals of the MMI coupler; and wherein each of all, or of all but one, of the waveguides is at least provided with, as seen from the MMI coupler, a first phase control element, a narrow band reflection grating, a second phase control element, and a wide frequency range reflection means.

Each of said narrow band reflection gratings is provided with a heater means for tuning the respective narrow band reflection grating to the wavelength channel to be dropped; the first phase control elements are effective to direct the channel to be dropped to the drop channel output terminal of the MMI coupler; the wide frequency range reflection means are effective to reflect all wavelength channels comprised in the input wavelength channel multiplex except the wavelength channel to be dropped; and the second phase control elements are effective to direct all wavelength channels comprised in the input wavelength channel multiplex except the wavelength channel to be dropped to the multiplex output terminal of the MMI coupler.

According to a third aspect of the present invention, an apparatus for optical add multiplexing of an add channel and a wavelength channel multiplex is provided, the apparatus comprising an MMI coupler at least of size 3×3 and an MI arm section.

The MMI coupler includes a multiplex input terminal for input of said wavelength channel multiplex into said MMI coupler; an add channel input terminal for input of the wavelength channel to be added to said multiplex into said MMI coupler; a multiplex output terminal for output of the wavelength channel multiplex from said MMI coupler; and at least three input/output terminals. Further, the MMI coupler is effective to split light incoming on one of its input terminals into light shares delivered onto its input/output terminals, and to combine light shares incoming on its input/output terminals into combined light delivered onto its output terminal in dependence on the mutual phase relation of the incoming light shares.

The MI arm section includes at least three waveguides, wherein each waveguide is optically connected to a respective one of said input/output terminals of the MMI coupler; and wherein each of all, or of all but one, of the waveguides is at least provided with, as seen from the MMI coupler, a first phase control element, a narrow band reflection grating, a second phase control element, and a wide frequency range reflection means.

Each of said narrow band reflection gratings is provided with a heater means for tuning the respective narrow band reflection grating to the wavelength channel to be added; the first phase control elements are effective to direct the channel to be added to the multiplex output terminal of the MMI coupler; the wide frequency range reflection means are effective to reflect all wavelength channels comprised in the input wavelength channel multiplex; and the second phase control elements are effective to direct all wavelength channels comprised in the input wavelength channel multiplex to the multiplex output terminal of the MMI coupler.

According to fourth and fifth aspects of the present invention methods for add and drop multiplexing, respectively, are provided for using the apparatus according to the first three aspects of the invention.

An advantage of the present invention is that it provides for a very effective and flexible add/drop multiplexing.

A further advantage of the present invention is that it provides for the handling of a large number of closely spaced wavelength channels.

Further characteristics of the invention and advantages thereof will be evident from the following detailed description of embodiments of the invention.

BRIEF DESCRIPTION OF THE DRAWINGS

The present invention will become more fully understood from the detailed description of embodiments of the present invention given hereinbelow and the accompanying FIGS. 1–5, which are given by way of illustration only, and thus are not limitative of the present invention.

DETAILED DESCRIPTION OF EMBODIMENTS

In the following description, for purposes of explanation and not limitation, specific details are set forth, such as particular techniques and applications in order to provide a thorough understanding of the present invention. However, it will be apparent to one skilled in the art that the present invention may be practiced in other embodiments that depart from these specific details. In other instances, detailed descriptions of well-known methods and apparatuses are omitted so as not to obscure the description of the present invention with unnecessary details.

Figure 1:
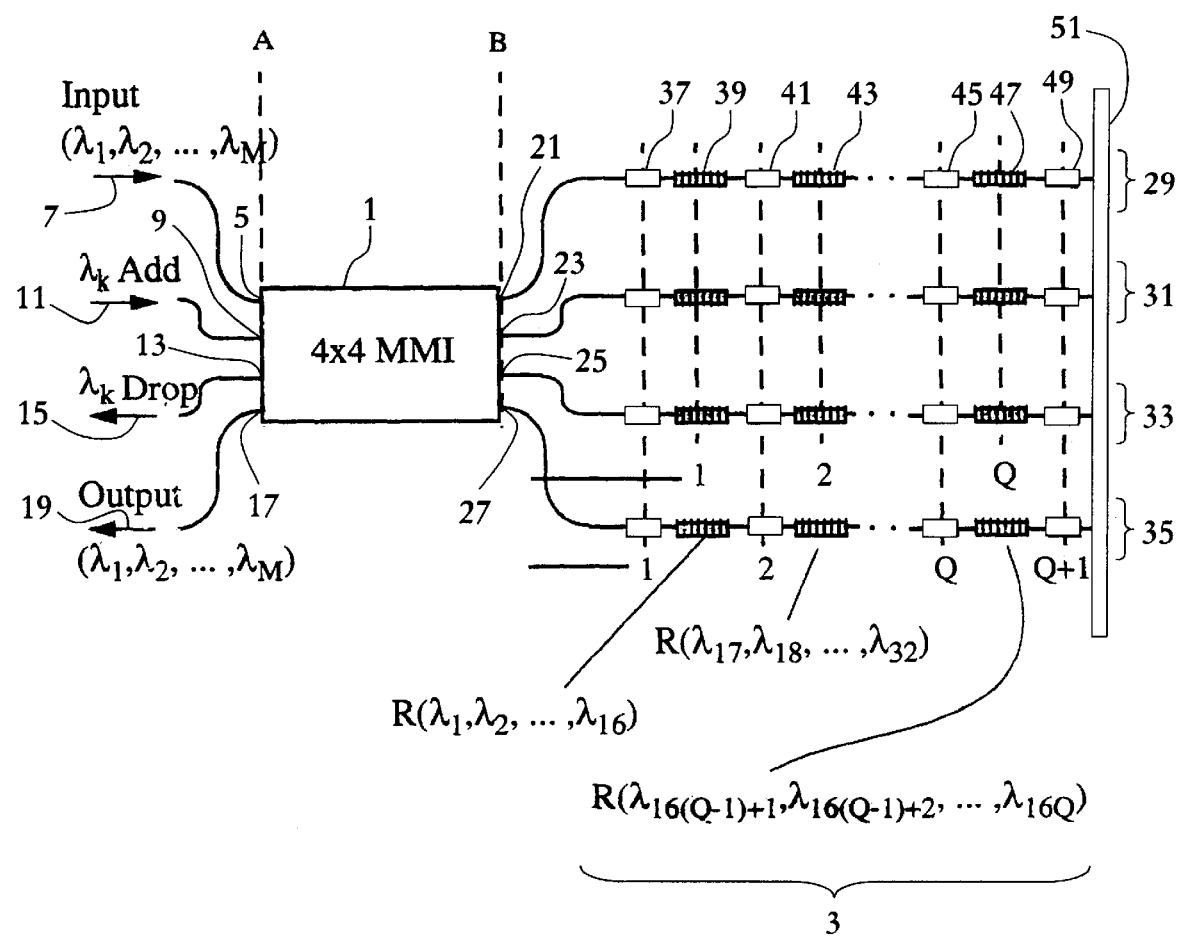
FIG. 1 illustrates, schematically, an apparatus for add/drop multiplexing according to a first embodiment of the present invention.

With reference to FIG. 1, which schematically illustrates an apparatus for add/drop multiplexing, a first embodiment of the present invention will be depicted.

The apparatus comprises a 4×4 MMI light power coupler 1 and an MI waveguide structure 3. MMI coupler 1 includes a multiplex input terminal 5 for input of a wavelength channel multiplex 7 into the MMI coupler, an add channel input terminal 9 for input of a wavelength channel 11 to be added to the multiplex into the MMI coupler; a drop channel output terminal 13 for output of from the MMI coupler a wavelength channel 15 to be dropped from the multiplex, a multiplex output terminal 17 for output of a wavelength channel multiplex 19 from the MMI coupler, and four input/output terminals 21, 23, 25, 27.

The MMI coupler 1 is adapted such that incoming light at anyone of terminals 7, 11, 15, 19 is splitted into four approximately equal light shares; each share being imaged onto a respective one of the four input/output terminals 21, 23, 25, 27. Further, MMI coupler 1 is capable of combining light shares input at the four input/output terminals 21, 23, 25, 27 into a single light beam and image this one at anyone of the terminals 7, 11, 15, 19 in dependence on the mutual phase relation of the four light shares at the four input/output terminals 21, 23, 25, 27.

The MI arm section 3 includes at least four waveguides or MI arms 29, 31, 33, 35, wherein each waveguide is optically connected to a respective one of the input/output terminals of the MMI coupler such that waveguide 29 is connected to output 21, waveguide 31 is connected to output 23, waveguide 33 is connected to output 25, and waveguide 35 is connected to output 27, respectively.

Each of the waveguides 29, 31, 33, 35 is provided with, as seen from the MMI coupler, a first phase control element 37, a first narrow band reflection grating 39, preferably a Bragg grating, a second phase control element 41, a second reflecting grating 43, etc. up to a Q'th phase control element 45, and a Q'th reflecting grating 47, Q being any positive integer. Further, each of the waveguides 29, 31, 33, 35 is provided with a (Q+1)'th phase control element 49, and a wide frequency range reflection means 51 at the end of the respective waveguide. The first phase control element 37 in each arm are together denoted a first control section, the second phase control element 41 in each arm are together denoted a second control section, etc. Correspondingly, the first narrow band reflection grating 39 in each arm are together denoted a first reflecting section, the second reflecting grating 43 in each arm are together denoted a second reflecting section, etc. The wide frequency range reflection means are together denoted a wide frequency range reflection section, WRS.

According to the invention each of the narrow band reflection gratings, No. 1, 2, ..., Q, is adapted, and provided with a controllable heater means (not illustrated), preferably a Peltier element, such that it is capable of reflecting one selectable wavelength channel in a respective group of wavelength channels and transmit all other wavelength channels within that group as well as the wavelength channels of all other groups. Thus, the first reflecting grating 39 is effective to reflect a selected wavelength channel among the channels in a first channel group, the second reflecting grating 43 is effective to reflect a selected wavelength channel among the channels in a second channel group, etc. up to the Q'th reflecting grating 47, which is effective to reflect a selected wavelength channel among the channels in a Q'th channel group. Finally, the wide frequency range reflection means 51 is effective to reflect all channels that are transmitted trough the Q reflecting gratings. The selections are made by tuning the respective narrow band reflection gratings by means of the respective heaters under the assumption that the reflecting gratings are of a material having a temperature T dependent refractive index n, i.e. $dn/dT \neq 0$. Preferably, the heater means are individually controllable and the reflecting gratings are of a material having a strongly temperature dependent refractive index, i.e. $|dn/dT|$ is high. Examples of such materials are various monomers and polymers.

Further, each of the phase control elements are effective to control the phase of all wavelength channels that are transmitted through it. In such manner the first phase control element 37 in respective waveguide may be used to control the phase of the wavelength channel reflected by the first reflecting grating 39 such that the wavelength channel is directed to the multiplex output 19 of the MMI coupler if it was input at add channel input terminal 9 (i.e. the channel is an add channel) and to direct the channel to drop channel output terminal 15 if it was input at channel multiplex input terminal 5 (i.e. the channel is a drop channel). Correspondingly, the second phase control element 41 in respective waveguide may be used to control the phase of the wavelength channel reflected by the second reflecting grating 43 such that it is directed towards multiplex output 19 of the MMI coupler if it is an add channel and towards drop channel output terminal 15 if it is a drop channel, etc. up to the Q'th phase control element 45 in respective waveguide, which may be used to control the phase of the wavelength channel reflected by the Q'th reflecting grating 47.

Finally, the (Q+1)'th phase control elements 49 are effective to direct all wavelength channels reflected by wide frequency range reflection means 51 to the multiplex output 19 of the MMI coupler 1.

It shall be appreciated that one or more of the channels reflected by the narrow band reflection gratings may also be directed to the multiplex output instead of to the drop channel output by means of the phase control elements. In such manner a single one, or more, of the reflected channels may be dropped.

It shall further be appreciated that the add/drop multiplexer may be implemented with one of the MI arms free from narrow band reflection gratings and phase control elements, and still obtain an identical operation.

The MMI coupler or waveguide 1 is in the forward direction working as a splitter and in the backward direction working as a router where the image position is decided by the mutual phase relation in the reflected light at the MI-arm/MMI intersection. The wavelength selectivity is as depicted handled by the reflecting sections and the phase control sections handle the routing.

For a wavelength channel reflected in one of the reflecting sections the corresponding phase control section decides where the channel is coupled. Consideration of the phase status of previous control sections is necessary. Table 1 gives the total phase control element level in each MI arm for coupling between add/drop apparatus relevant terminal combinations for a 4×4 MMI waveguide.

TABLE 1

| Coupling | $\phi_1$ | $\phi_2$ | $\phi_3$ |
|---|---|---|---|
| Input-Drop | π | 0 | π |
| Input-Output | 0 | 3π/ | 3π/ |
| Add-Output | π | 0 | π |

No phase control elements are assumed in the fourth MI arm.

The total phase element state $\phi_i$ for arm I is given by the sum of phase elements before reflection. For λ reflected in section k according to FIG. 1:

$$\varphi_i = 2\sum_{j=1}^{k} \delta\varphi_{ij} \qquad (1)$$

where $\delta\phi_{ij}$ is the phase status for the single element j in MI arm i. Factor 2 in (1) is due to that light passes each element twice. Coupling input-drop and add-output have the same phase element setup as given by table 1. Consequently it is possible to drop one wavelength channel and at the same time add new information on the same wavelength carrier. Each grating should cover one sub-band using the temperature to tune for reflection of the correct channel, for example grating number one should be able to reflect $\lambda_1$ to $\lambda_8$ and grating number two $\lambda_9$ to $\lambda_{16}$ and so on. Channels, which are not reflected in any of the grating sections will as depicted, be reflected by the wide frequency range reflection section (WRS) at the end of the MI-arms. This section should be carefully considered since the reflection level will affect the filter response for the whole wavelength range. If we consider one Bragg grating section between the MMI and the WRS the field response for one MI-arm is described by $$\psi_r = \exp(2j\phi_1)r_1\psi_i + \frac{r_2\psi_i t_1^2 \exp(-2j(\beta L - \phi_1 - \phi_2))}{1 - r_1 r_2 \exp(-2j(\beta L - \phi_2))} \qquad (2)$$

where $\psi_i$ is the incident field function and $\psi_r$ is the reflected field function, $r_1$ and $t_1$ are the Bragg grating reflection and transmission coefficient respectively and $r_2$ is the WRS reflection coefficient, $\phi_1$ and $\phi_2$ are the phase control state for phase control element number 1 and 2 respectively and L is the distance between the grating and the WRS. From eq. (2) it is concluded that $r_2$ should not be very close to 1 in order to enable stable filter response behaviour. Also the add/drop channel isolation performance will be badly influenced if $r_2$ is close to 1, see results from a theoretical simulation below.

Thus, each of the wide frequency range reflection means, i.e. the WRS, has a reflection coefficient below 1 for the wavelength channels comprised in the input wavelength channel multiplex. The reflection coefficient is particularly between 0.82 and 0.98, preferably between 0.86 and 0.94, more preferably between 0.88 and 0.92, and most preferably around 0.90.

Alternatively, each of the waveguides are provided with a damping section adjacent to respective wide frequency range reflection means. This may be implemented in a variety of ways. One example is simply to provide prolonged waveguides, which exhibit a certain damping.

The inventive optical add/drop multiplexer apparatus is preferably implemented in a planar waveguide technology, preferably in a polymer planar lightwave circuit technology.

Results from a theoretical analysis will now be presented. The design used in the analysis was as follows. The waveguide layer thickness was 6 μm, the cladding index was 1.453 and the index step Δ was 0.7%. The width of the single mode waveguides between the MMI-structures was 6 μm. To decrease the coupling loss the single mode waveguides were tapered to 12 μm in the MMI-waveguide intersection. The 4×4 MMI length $L_{4\times4}$ was 6500 μm, the width $W_{4\times4}$ was 80 μm and the access waveguide of the 4×4 MMI was symmetrically spaced with a center—center distance of 20.8 μm. For the analysis one grating section (Q=1 in FIG. 1) was used. The length of the Bragg grating (Bg) section $L_{Bg}$ was 3 mm with a grating period Λ of 530 nm and a Hamming window was used for the grating kappa distribution, $\kappa(Z) = \kappa_m(0.54+0.46 \cos(2\pi z/L_{Bg}))$ where $-L_{Bg}/2 < z < L_{Bg}/2$ and $\kappa_m = 2.5$ mm$^{-1}$. The WRS reflection coefficient $r_2$ was 0.9. A temperature dependence dλ/dT=0.25 nm/°C. was assumed.

Figure 2A:
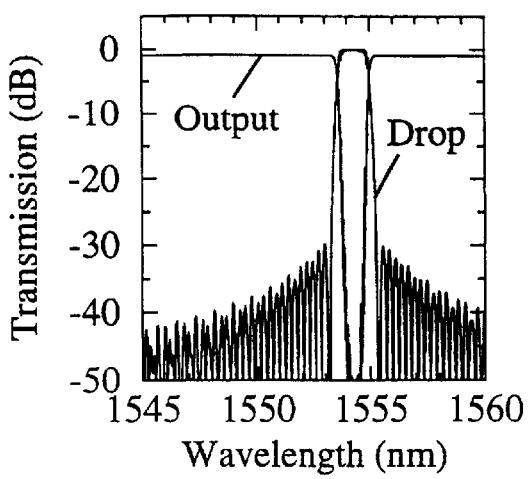
FIGS. 2a–f show filter response for the apparatus of FIG. 1: (a) Filter response for T=40° C. (b) Blow up of drop range for T=40° C. (c) Filter response for T=60 ° C. (d) Blow up of drop passband range for T=60° C. (e) Filter response for T=40 ° C. and phase setup adjusted for all channels to pass trough (f) Blow up of the Bragg reflection range for T=40° C. and phase setup adjusted for all channels to pass trough.
Figure 2B:
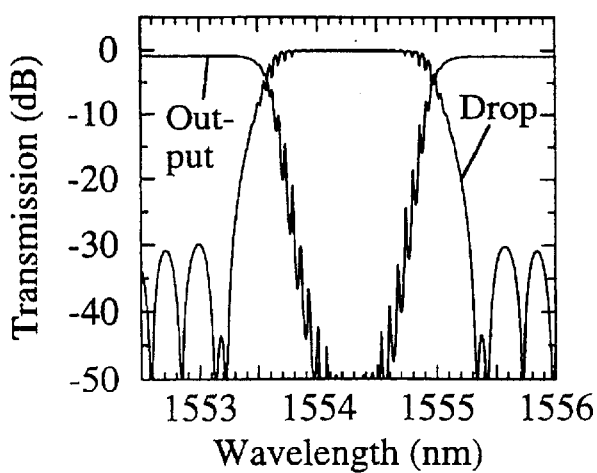
Figure 2C:
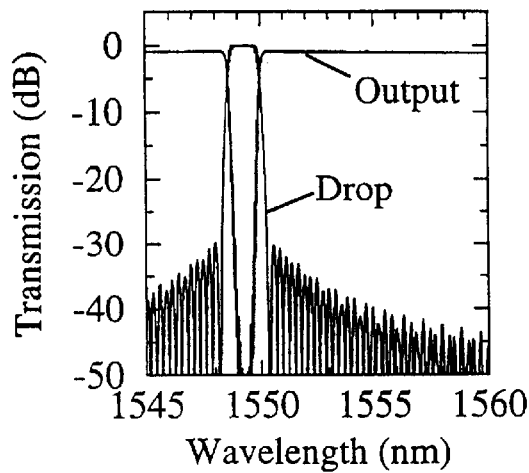
Figure 2D:
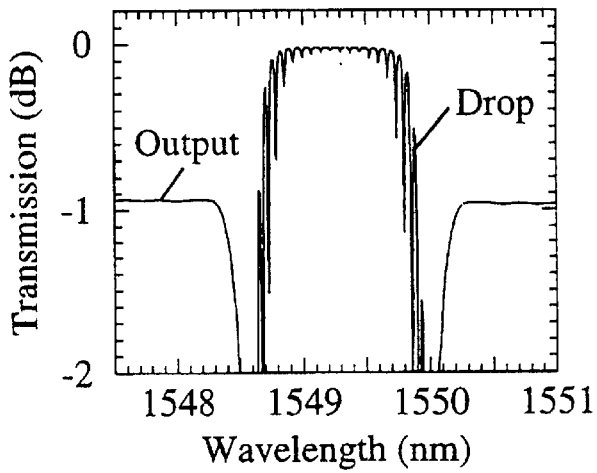
Figure 2E:
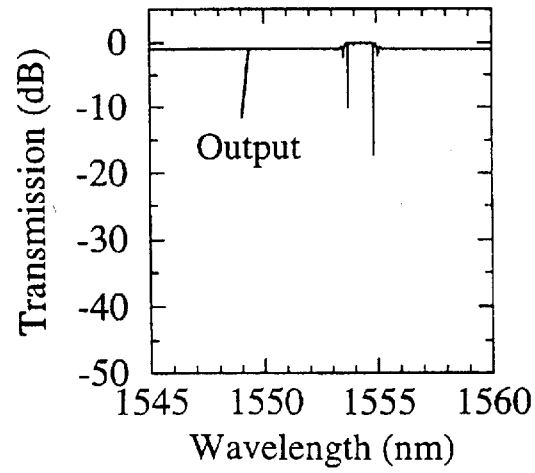
Figure 2F:
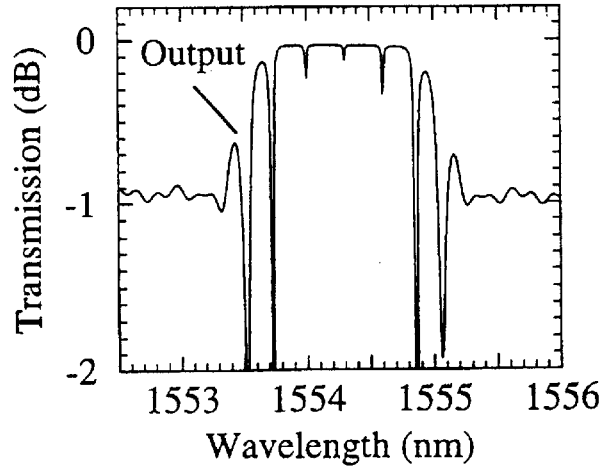
Figure 3A:
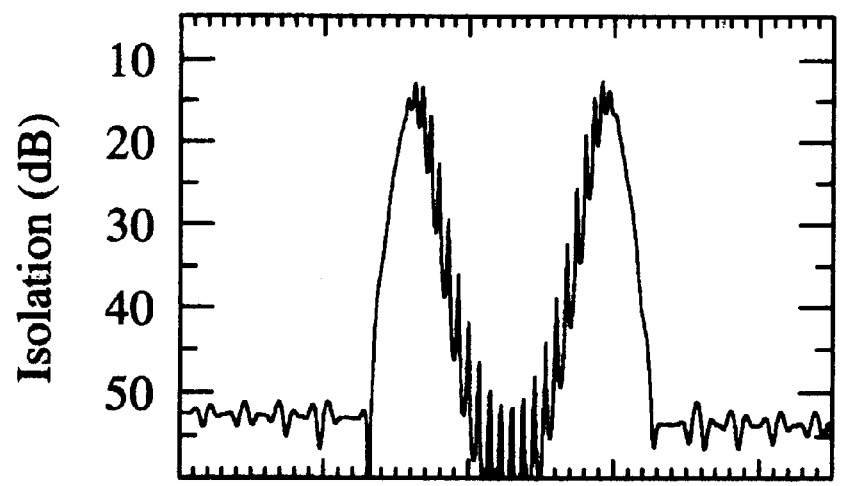
FIGS. 3a–c illustrate add/drop channel isolation: (a) WSR reflection coefficient r=0.9 (b) r=0.97 (c) r=1.
Figure 3B:
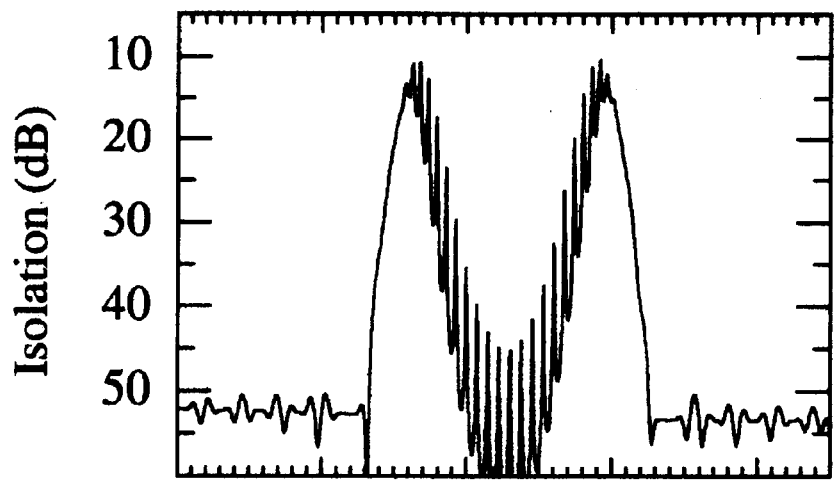
Figure 3C:
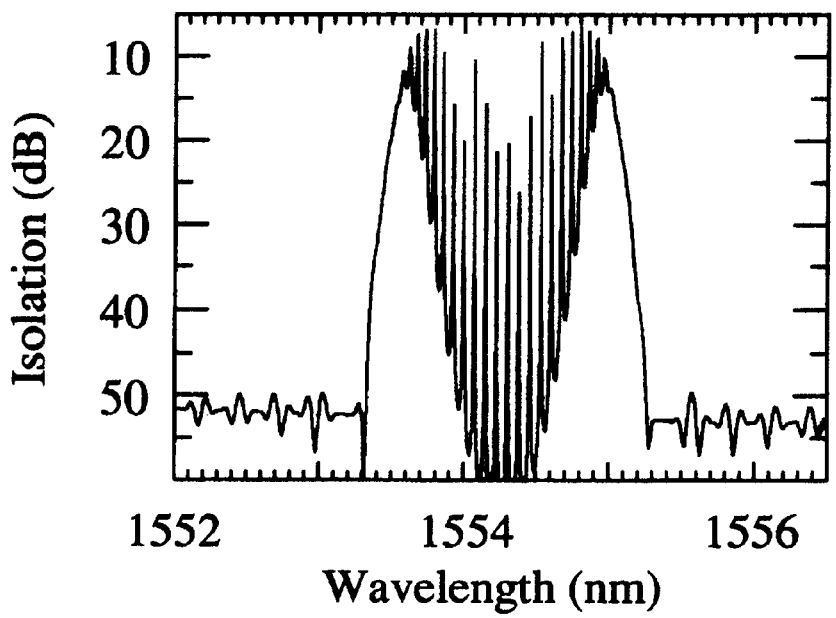

The simulation has been based on the mode propagation analysis (MPA) given in L. B. Soldano and E. C. M. Pennings, *Optical Multi-Mode Interference Devices Based on Self-Imaging: Principles and Applications*, J. Lightwave Technol. vol. 13(4), pp. 615–627, April 1995. The Bragg gratings were treated with the matrix formalism given in G. P. Agrawal and S. Radic, *Phase-shifted Fiber Bragg Gratings and their Application for Wavelength Demultiplexing*, IEEE Photon. Tech. Lett., vol. 6(8), pp. 995–997, August 1994. It is assumed that a Gaussian-shaped field can describe the fundamental mode of the single mode waveguides. The computation results are shown in FIGS. 2a–f. In FIGS. 2e–f it is shown that also the channel reflected by the grating section is possible to couple directly to the output terminal. This is a vital functionality in order to enable cascading Bragg gratings with different Λ and still be able to drop only one channel. The theoretical loss for the drop channel was below 0.2 dB and the 1-dB bandwidth was about 120 GHz. The ripple in the pass band is due to Fabry Perot effects between the Bragg grating section and the WRS. The transmission loss for the passing trough channels was around 1 dB using a WRS with r=0.9. In addition to the filter characteristics graphs showed in FIGS. 2a–f add/drop-channel isolation has also to be considered. In FIGS. 3a–c the add/drop isolation is showed for three different WRS reflection coefficients for the same phase control element setup and T as give transmission characteristics showed in FIGS. 2a–b. For WRS reflection coefficient r=0.9 the add/drop channel isolation was above 45 dB for an 80 GHz range. The width of the low isolation range at band edges can be reduced using a longer grating. The analysis has not considered any material induced loss and no polarization dependency anywhere in the device.

The WRS can be implemented by using metallic mirror on the waveguide ends or by using broadband reflecting Bragg gratings, preferably chirped Bragg gratings.

Figure 4A:
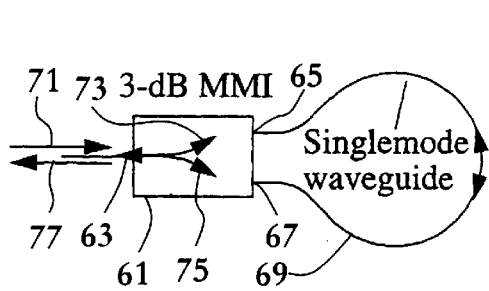
FIG. 4a illustrates schematically a layout of an integrated wide frequency range reflection configuration based on a feedback 3-dB MMI and FIG. 4b shows reflection response for three different MMI output waveguide separations (dotted line 21.7 µm, dashed line 23.7 µm, solid line 25.3 µm).

Alternatively, it is possible to implement a complete integrated configuration. In FIG. 4a a layout of such an integrated wide frequency range reflection configuration based on a feedback 3-dB MMI is schematically illustrated. Such configuration requires a high contrast waveguide in order to get a moderate size. It shall be appreciated that each of the MI waveguides is provided with a respective one of this configuration at its far end.

The configuration comprises a light power coupler 61, particularly a conventional 3-dB 1×2 MMI, having an input terminal 63 and at least two output terminals 65, 67. Further, a loop waveguide 69 is connected to the two output terminals of the light power coupler. The light power coupler is effective to split light 71 incoming onto its input terminal, each share 73, 75 delivered on one of its two output terminals, and to combine light incoming on its two output terminals into combined light 77 delivered on its input terminal. The loop waveguide 69 is effective to conduct light delivered on each one of the output terminals of the light power coupler back into the other one of these output terminals.

Preferably, the loop 69 of each of the loop mirror devices is a planar waveguide at or in the surface of a substrate having a refractive index adapted to the refractive index of the material surrounding the planar waveguide and wherein the loop of each of the loop mirror devices has the shape of a strip extending from one of the output terminals of the light power coupler to the other of these output terminals.

Also preferably, the light power coupler of each of the loop mirror devices is a planar rectangular plate at or in the surface of the substrate and having an adapted size such that its input terminal is formed at one side of the rectangular plate and its two output terminals are formed at an opposite side thereof.

In an alternative embodiment the rectangular plate forming the coupler and the planar waveguide forming the loop are integrated into a single unit plate having a uniform refractive index.

Reference is here made to our Swedish patent application No. 9804558-6, which application is hereby incorporated by reference.

Figure 4B:
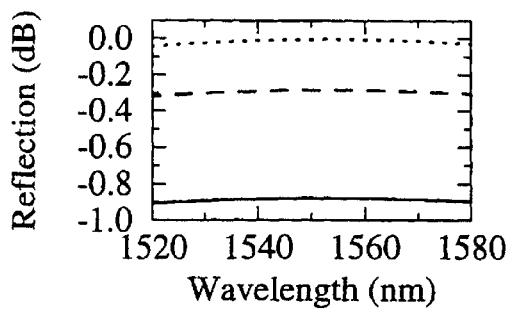

In FIG. 4b is shown how the reflection level is influenced by the output waveguide spacing. When considering a physical implementation of this device the waveguide loss also have to be considered and it is therefore likely that the output waveguide spacing should be optimized in order to maximize the WRS reflection coefficient.

The device shown in FIG. 1 can in principle produce complete add/drop functionality. However, even if the add and drop channel carriers are produced by different light sources there is a risk for add/drop channel interference, especially for closely spaced channels, and consequently all the carriers are close to the ITU grid. This problem can be solved using separate structures for add and drop functionality.

Figure 5:
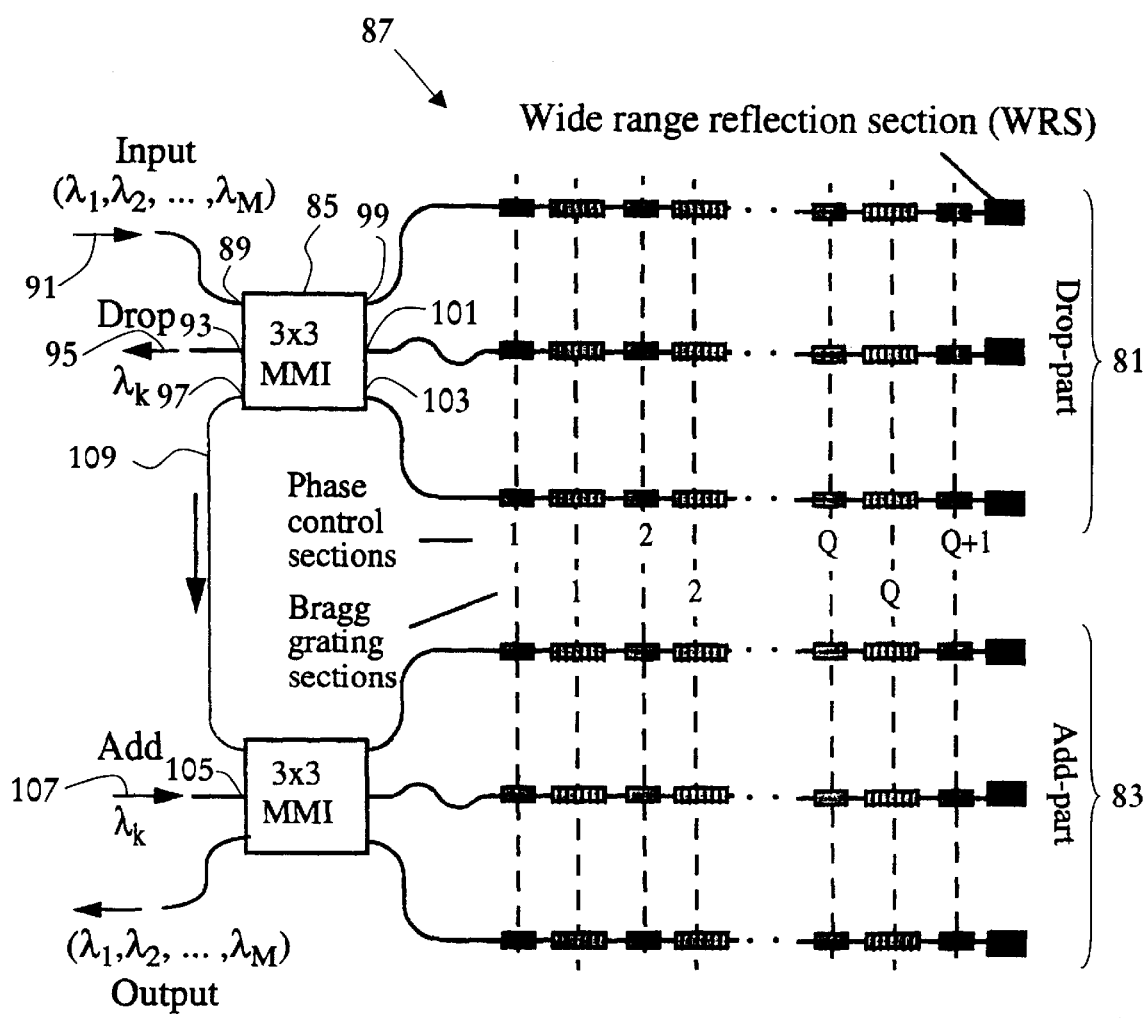
FIG. 5 illustrates, schematically, an apparatus for add/drop multiplexing according to a second embodiment of the present invention.

Thus, with reference to FIG. 5, a second embodiment apparatus for add/drop multiplexing will be depicted. Such apparatus is divided into two separate units; a drop part 81 and an add part 83.

Drop part 81 comprises an MMI coupler 85 of size 3×3 and an MI arm section 87.

MMI coupler 85 further includes a multiplex input terminal 89 for input of a wavelength channel multiplex 91 into the MMI coupler, a drop channel output terminal 93 for output of a wavelength channel 95 to be dropped from the multiplex, a multiplex output terminal 97 for output of the remaining wavelength channel multiplex, and at least three input/output terminals 99, 101, 103.

MI arm section 87 further includes three waveguides, wherein each waveguide is optically connected to a respective one of the input/output terminals 99, 101, 103. Further, each of the three waveguides is provided with identical equipment as the MI waveguides 29, 31, 33, and 35 of FIG. 1.

Add part 83 is identical with drop part 81 except of that it comprises an add channel input terminal 105 instead of drop channel output terminal 93. The add channel input terminal 105 is corresponding to terminal 9 of the FIG. 1 embodiment apparatus, and is arranged for input of a wavelength channel 107 to be added to the multiplex.

Further, a connection waveguide 109 is connected between the multiplex output terminal 97 of the drop part 81 and the multiplex input terminal of the add part 83.

Thus, by the FIG. 5 embodiment a function identical with the function of the FIG. 1 embodiment is obtained. A strong channel interference suppression is in such way achieved to the cost of a slightly more complex apparatus (one more MMI coupler and two more equipped MI waveguides).

Optionally, an optical isolator (not illustrated) is arranged in the connection waveguide to further suppress the add/drop channel interference.

There are also some critical issues considering the physical implementation of this device. For example, all channels which are not reflected by any grating will be reflected by the WRS and pass each grating twice. Therefore it is vital that Bragg gratings with low cladding mode coupling induced loss can be implemented. Furthermore the heater implementation has to be carefully considered in order to reduce the risk for thermally induced crosstalk. For example temperature gradients perpendicular to MI-waveguide directions can give phase errors. For ideal phase control settings the add/drop channel isolation is above 45 dB, but the isolation is quite sensitive to phase element errors. For example with phase control element errors of 0.1 rad. for MI arm 31 of FIG. 1, 0.2 rad. For MI arm 33, and 0.3 rad. For MI arm 35 (in relation to MI arm 29) the isolation is around 22 dB.

A tunable add/drop-multiplexer (with 200 GHz channel spacing) based on the novel MMIMIBg principle is disclosed in the present application. The theoretical analysis indicates good add/drop channel isolation, above 45 dB for an 80 GHz range using proper WRS reflection coefficient; neighbor channel crosstalk below −30 dB was achieved when using a Hamming window Bragg grating. The theoretical loss for passing through channels was around 1 dB and for the drop channel below 0.2 dB with a 1-dB bandwidth around 120 GHz.

It will be obvious that the invention may be varied in a plurality of ways. Such variations are not to be regarded as a departure from the scope of the invention. All such modifications as would be obvious to one skilled in the art are intended to be included within the scope of the appended Claims.

What is claimed is:

1. An apparatus for optical add/drop multiplexing of a wavelength channel multiplex, said apparatus comprising an MMI coupler (1) at least of size 4×4 and an MI arm section (3);

said MMI coupler including a multiplex input terminal (5) for input of said wavelength channel multiplex into said MMI coupler, an add channel input terminal (9) for input of a wavelength channel to be added to said multiplex into said MMI coupler, a drop channel output terminal (13) for output of a wavelength channel to be dropped from said multiplex from said MMI coupler, a multiplex output terminal (17) for output of said wavelength channel multiplex from said MMI coupler, and at least four input/output terminals (21, 23, 25, 27); and said MMI coupler being effective to split light incoming on one of its input terminals into light shares delivered onto its input/output terminals, and to combine light shares incoming on its input/output terminals into combined light delivered onto one of its output terminals in dependence on the mutual phase relation of the incoming light shares; and said MI arm section including at least four waveguides (29, 31, 33, 35), of which each is optically connected to a respective one of said input/output terminals of the MMI coupler, and of which each of all, or of all but one, of the waveguides is at least provided with, as seen from the MMI coupler, a first phase control element (37), a narrow band reflection grating (39), a second phase control element (47), and a wide frequency range reflection means (51);

each of said narrow band reflection gratings being provided with a heater means for tuning the respective narrow band reflection grating to the wavelength channel to be added and/or to the wavelength channel to be dropped;

said first phase control elements being effective to direct the channel to be added to the multiplex output terminal of the MMI coupler and/or to direct the channel to be dropped to the drop channel output terminal of the MMI coupler;

said wide frequency range reflection means being effective to reflect all wavelength channels comprised in the input wavelength channel multiplex except the wavelength channel to be dropped; and said second phase control elements being effective to direct all wavelength channels comprised in the input wavelength channel multiplex except the wavelength channel to be dropped to the multiplex output terminal of the MMI coupler.

2. The apparatus as claimed in claim 1 wherein the heater means are individually controllable.

3. The apparatus as claimed in claim 1 wherein the heater means are Peltier elements.

4. The apparatus as claimed in claim 1 wherein the narrow band tunable reflection gratings are Bragg gratings (39).

5. The apparatus as claimed in claim 4 wherein the Bragg gratings are made of a material having a strongly temperature dependent refractive index, i.e. a high $|dn/dT|$.

6. The apparatus as claimed in claim 5 wherein said Bragg grating material is a monomer or a polymer.

7. The apparatus as claimed in claim 1 wherein each of the wide frequency range reflection means has a reflection coefficient below 1 for the wavelength channels comprised in the input wavelength channel multiplex.

8. The apparatus as claimed in claim 7 wherein said reflection coefficient is between 0.82 and 0.98, preferably between 0.86 and 0.94, more preferably between 0.88 and 0.92, and most preferably around 0.90.

9. The apparatus as claimed in claim 1 wherein the wide frequency range reflection means are each comprised of a broadband reflecting Bragg grating.

10. The apparatus as claimed in claim 9 wherein each of the broadband reflecting Bragg gratings is chirped.

11. The apparatus as claimed in claim 1 wherein the wide frequency range reflection means are each comprised of a metallic mirror (51).

12. The apparatus as claimed in claim 1 wherein the wide frequency range reflection means are each comprised of a loop mirror device.

13. The apparatus as claimed in claim 12 wherein each of the loop mirror devices comprises a light power coupler (61), particularly an MMI coupler, having an input terminal (63) and at least two output terminals (65, 67), and a loop (69) connected to the two output terminals of the light power coupler, said light power coupler being effective to split light incoming onto its input terminal into light shares delivered on its two output terminals, and to combine light incoming on its two output terminals into combined light delivered on its input terminal, and said loop being effective to conduct light delivered on each one of the output terminals of the light power coupler back into the other one of these output terminals.

14. The apparatus as claimed in claim 13 wherein the loop of each of the loop mirror devices is a planar waveguide at or in the surface of a substrate having a refractive index adapted to the refractive index of the material surrounding the planar waveguide and wherein the loop of each of the loop mirror devices has the shape of a strip extending from one of the output terminals of the light power coupler to the other of these output terminals.

15. The apparatus as claimed in claim 14 wherein the light power coupler of each of the loop mirror devices is a planar rectangular plate at or in the surface of the substrate and having an adapted size such that its input terminal is formed at one side of the rectangular plate and its two output terminals are formed at an opposite side thereof.

16. The apparatus as claimed in claim 15 wherein the rectangular plate forming the coupler and the planar waveguide forming the loop are integrated into a single unit plate having a uniform refractive index.

17. The apparatus as claimed in claim 1 for optical add/drop multiplexing of a wavelength channel multiplex comprising Q wavelength channel groups, each channel group comprising M adjacent wavelength channels, Q and M being positive integers larger than 1, wherein each of the at least four waveguides is provided with Q+1 phase control elements (37, 41, 45, 49) provided with heater means and Q narrow band reflection gratings (39, 43, 47); and wherein each of the Q narrow band reflection gratings in each waveguide is tunable to a respective one of the M wavelength channels to be added and/or dropped in a respective one of the Q channel groups;

each of Q of the Q+1 phase control elements in each waveguide is effective to direct a respective one of the M wavelength channels to be added in a respective one of the Q channel groups to the multiplex output terminal of the MMI coupler, and/or to direct a respective one of the M wavelength channels to be dropped in a respective one of the Q channel groups to the drop channel output terminal or to the multiplex output terminal of the MMI coupler;

the wide frequency range reflection means in each waveguide is effective to reflect all wavelength channels comprised in the input wavelength channel multiplex except wavelength channels to be dropped; and the last one of the Q+1 phase control elements in each waveguide is effective to direct all wavelength channels comprised in the input wavelength channel multiplex except wavelength channels to be dropped to the multiplex output terminal of the MMI coupler.

18. An apparatus (81) for optical drop multiplexing of a wavelength channel multiplex, said apparatus comprising an MMI coupler (85) at least of size 3×3 and an MI arm section (87), said MMI coupler including a multiplex input terminal (89) for input of said wavelength channel multiplex into said MMI coupler, a drop channel output terminal (93) for output of a wavelength channel to be dropped from said multiplex from said MMI coupler, a multiplex output terminal (97) for output of the remaining wavelength channel multiplex from said MMI coupler, and at least three input/output terminals (99, 101, 103); and said MMI coupler being effective to split light incoming on its input terminal into light shares delivered onto its input/output terminals, and to combine light shares incoming on its input/output terminals into combined light delivered onto one of its output terminals in dependence on the mutual phase relation of the incoming light shares; and said MI arm section including at least three waveguides, of which each is optically connected to a respective one of said input/output terminals of the MMI coupler, and of which each of all, or of all but one, of the waveguides is at least provided with, as seen from the MMI coupler, a first phase control element, a narrow band reflection grating, a second phase control element, and a wide frequency range reflection means;

each of said narrow band reflection gratings being provided with a heater means for tuning the respective narrow band reflection grating to the wavelength channel to be dropped;

said first phase control elements being effective to direct the channel to be dropped to the drop channel output terminal of the MMI coupler;

said wide frequency range reflection means being effective to reflect all wavelength channels comprised in the input wavelength channel multiplex except the wavelength channel to be dropped; and said second phase control elements being effective to direct all wavelength channels comprised in the input wavelength channel multiplex except the wavelength channel to be dropped to the multiplex output terminal of the MMI coupler.

19. An apparatus for optical add/drop multiplexing comprising the drop multiplexing apparatus as claimed in claim 18, and an add multiplexing apparatus for optical add multiplexing of an add channel and a wavelength channel multiplex, said apparatus comprising an MMI coupler at least of size 3×3 and an MI arm section, said MMI coupler including a multiplex input terminal for input of said wavelength channel multiplex into said MMI coupler, an add channel input terminal (105) for input of the wavelength channel to be added to said multiplex into said MMI coupler, a multiplex output terminal for output of the wavelength channel multiplex from said MMI coupler, and at least three input/output terminals; and said MMI coupler being effective to split light incoming on one of its input terminals into light shares delivered onto its input/output terminals, and to combine light shares incoming on its input/out terminals into combined light delivered onto its output terminal in dependence on the mutual phase relation of the incoming light shares; and said MI arm section including at least three waveguides, of which each is optically connected to a respective one of said input/output terminals of the MMI coupler, and of which each of all, or of all but one, of the waveguides is at least provided with, as seen from the MMI coupler, a first phase control element, a narrow band reflection grating, a second phase control element, and a wide frequency range reflection means;

each of said narrow band reflection gratings being provided with a heater means for tuning the respective narrow band reflection to the wavelength channel to be added;

said first phase control elements being effective to direct the channel to be added to the multiplex output terminal of the MMI coupler;

said wide frequency range reflection means being effective to reflect all wavelength channels comprised in the input wavelength channel multiplex; and said second phase control elements being effective to direct all wavelength channels comprised in the input wavelength channel multiplex to the multiplex output terminal of the MMI coupler;

wherein the multiplex output terminal of the drop multiplexing apparatus and the multiplex input terminal of the add multiplexing apparatus are optically connected by means of a connection waveguide (109).

20. The apparatus as claimed in claim 19 wherein an optical isolator is arranged in the connection waveguide.

21. The apparatus as claimed in claim 19 wherein each the wide frequency range reflection means has a reflection coefficient below 1 for the wavelength channels comprised in the input wavelength channel multiplex.

22. The apparatus as claimed in claim 21 wherein said reflection coefficient is between 0.82 and 0.98, preferably between 0.86 and 0.94, more preferably between 0.88 and 0.92, and most preferably around 0.90.

23. The apparatus as claimed in claim 19 wherein the wide frequency range reflection means are each comprised of a loop mirror device.

24. The apparatus as claimed in claim 23 wherein each of the loop mirror devices comprises a light power coupler (61), particularly an MMI coupler, having an input terminal (63) and at least two output terminals (65, 67), and a loop (69) connected to the two output terminals of the light power coupler, said light power coupler being effective to split light incoming onto its input terminal into light shares delivered on its two output terminals, and to combine light incoming on its two output terminals into combined light delivered on its input terminal, and said loop being effective to conduct light delivered on each one of the output terminals of the light power coupler back into the other one of these output terminals.

25. The apparatus as claimed in claim 24 wherein the loop of each of the loop mirror devices is a planar waveguide at or in the surface of a substrate having a refractive index adapted to the refractive index of the material surrounding the planar waveguide and wherein the loop of each of the loop mirror devices has the shape of a strip extending from one of the output terminals of the light power coupler to the other of these output terminals.

26. The apparatus as claimed in claim 25 wherein the light power coupler of each of the loop mirror devices is a planar rectangular plate at or in the surface of the substrate and having an adapted size such that its input terminal is formed at one side of the rectangular plate and its two output terminals are formed at an opposite side thereof.

27. The apparatus as claimed in claim 26 wherein the rectangular plate forming the coupler and the planar waveguide forming the loop are integrated into a single unit plate having a uniform refractive index.

28. An apparatus (83) for optical add multiplexing of an add channel and a wavelength channel multiplex, said apparatus comprising an MMI coupler at least of size 3×3 and an MI arm section, said MMI coupler including a multiplex input terminal for input of said wavelength channel multiplex into said MMI coupler, an add channel input terminal (105) for input of the wavelength channel to be added to said multiplex into said MMI coupler, a multiplex output terminal for output of the wavelength channel multiplex from said MMI coupler, and at least three input/output terminals; and said MMI coupler being effective to split light incoming on one of its input terminals into light shares delivered onto its input/output terminals, and to combine light shares incoming on its input/output terminals into combined light delivered onto its output terminal in dependence on the mutual phase relation of the incoming light shares; and said MI arm section including at least three waveguides, of which each is optically connected to a respective one of said input/output terminals of the MMI coupler, and of which each of all, or of all but one, of the waveguides is at least provided with, as seen from the MMI coupler, a first phase control element, a narrow band reflection grating, a second phase control element, and a wide frequency range reflection means;

each of said narrow band reflection gratings being provided with a heater means for tuning the respective narrow band reflection grating to the wavelength channel to be added;

said first phase control elements being effective to direct the channel to be added to the multiplex output terminal of the MMI coupler;

said wide frequency range reflection means being effective to reflect all wavelength channels comprised in the input wavelength channel multiplex; and said second phase control elements being effective to direct all wavelength channels comprised in the input wavelength channel multiplex to the multiplex output terminal of the MMI coupler.

29. In an apparatus including an MMI coupler (1; 85) optically connected to an MI arm section (3; 87), said MMI coupler including a multiplex input terminal (5; 89), a drop channel output terminal (13; 93) and a multiplex output terminal (17; 97), and said configuration comprising a plurality of waveguides (29, 31, 33, 35) arranged in parallel, each of all, or of all but one, of the waveguides being provided with a first phase control element (37), a narrow band reflection grating (39), a second phase control element (49), and a wide frequency range reflection means (51), the narrow band reflection grating being provided with a heater means, a method for optical drop multiplexing of a wavelength channel multiplex (7; 91) comprising the steps of:

introducing said wavelength channel multiplex into said MMI coupler and splitting the input wavelength channel multiplex into a plurality of light shares;

introducing each of the multiplex shares into a respective one of the waveguides arranged in parallel;

tuning the respective narrow band reflection grating to a wavelength channel (15; 107) to be dropped by means of its associated heater means and thus reflecting this channel and transmitting the remaining channels in the input channel multiplex;

reflecting the remaining channels in the input channel multiplex by means of said wide frequency range reflection means;

directing the channel to be dropped to the drop channel output terminal of the MMI coupler by means of said first phase control elements; and directing the remaining channels in the input channel multiplex to the multiplex output terminal of the MMI coupler by means of said second phase control elements.

30. In an apparatus including an MMI coupler (1) optically connected to an MI arm section (3), said MMI coupler including a multiplex input terminal (5), an add channel input terminal (9; 105) and a multiplex output terminal (17), and said configuration comprising a plurality of waveguides (29, 31, 33, 35) arranged in parallel, each of all, or of all but one, of the waveguides being provided with a first phase control element (37), a narrow band reflection grating (39), a second phase control element (49), and a wide frequency range reflection means (51), the narrow band reflection grating being provided with a heater means, a method for optical add multiplexing of a wavelength channel (11; 107) and a wavelength channel multiplex (7; 91) comprising the steps of:

introducing said wavelength channel multiplex into said MMI coupler and splitting the input wavelength channel multiplex into a plurality of multiplex shares;

introducing each of the multiplex shares into a respective one of the waveguides arranged in parallel;

introducing said wavelength channel into said MMI coupler and splitting the input wavelength channel into a plurality of channel shares;

introducing each of the channel shares into a respective one of the waveguides arranged in parallel;

tuning the respective narrow band reflection grating to the wavelength channel to be added by means of its associated heater means and thus reflecting this channel and transmitting the input channel multiplex;

reflecting the input channel multiplex by means of said wide frequency range reflection means;

directing the channel to be added to the multiplex output terminal of the MMI coupler by means of said first phase control elements; and directing the input channel multiplex to the multiplex output terminal of the MMI coupler by means of said second phase control elements.

* * * * *